(12) United States Patent
Asturias et al.

(10) Patent No.: US 12,287,800 B2
(45) Date of Patent: Apr. 29, 2025

(54) PROFILE REGISTRY AND RESOURCE MANAGEMENT

(71) Applicant: Arista Networks, Inc., Santa Clara, CA (US)

(72) Inventors: Diego Alfredo Asturias, Mountain View, CA (US); Alejandro Javier Schwoykoski, Sydney (AU); Adam Gordon Wiggins, Sydney (AU)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 18/307,558

(22) Filed: Apr. 26, 2023

(65) Prior Publication Data

US 2024/0362244 A1 Oct. 31, 2024

(51) Int. Cl.
*G06F 16/25* (2019.01)
*G06F 8/30* (2018.01)
*G06F 8/61* (2018.01)

(52) U.S. Cl.
CPC .............. *G06F 16/252* (2019.01); *G06F 8/31* (2013.01); *G06F 8/61* (2013.01)

(58) Field of Classification Search
CPC .............. G06F 16/252; G06F 8/31; G06F 8/61
See application file for complete search history.

(56) References Cited

U.S. PATENT DOCUMENTS

| | | | |
|---|---|---|---|
| 2008/0186929 A1* | 8/2008 | Rice | H04L 65/104 370/338 |
| 2009/0086688 A1* | 4/2009 | Kvache | H04L 65/1026 370/338 |
| 2016/0127239 A1* | 5/2016 | Kahn | H04W 28/02 370/254 |
| 2016/0132214 A1* | 5/2016 | Koushik | G06F 8/61 715/741 |
| 2019/0369977 A1* | 12/2019 | Wiswall | H04L 67/34 |
| 2020/0218530 A1* | 7/2020 | Rakhimov | G06F 9/4843 |

* cited by examiner

*Primary Examiner* — Cam Y T Truong
(74) *Attorney, Agent, or Firm* — Fountainhead Law Group, PC

(57) ABSTRACT

Functionality in a network device is specified by an application installation file that describes programmable devices used to implement the functionality. Profiles for programmable devices generated from the application installation file and stored on the network device. A profile database stores profiles associated with functionality specified in previously received application installation files. A profile associated with a selected functionality is selected to implement the selected functionality, including loading one or more bitfiles identified in the selected profile to program the programmable devices associated with the selected functionality.

14 Claims, 5 Drawing Sheets profile, 212

```
{
    "appVendor": "Acme Co.",
    "appName": "Example App",
    "appVersion": "1.0.0",
    "profiles": [
        {
            // profile1 specifies one set of capabilities
            // for this application
            "name": "profile1",
            "description": "profile1 description",
            "hidden": false,
            "bitStreamInfo": {
                "bitfile": "/opt/apps/example",
                "boardStd": "1b2",
                "bitVersion": "1.0.0"
            },
            "features": {
                "feature_A": {},
                "feature_B": {}
            }
        },
        {
            // profile2 specifies another set of capabilities
            // for this application
            "name": "profile2",
            "description": "profile2 description",
            "hidden": true,
            "bitStreamInfo": {
                "bitfile": "/opt/apps/example2",
                "boardStd": "1b2",
                "bitVersion": "1.0.0"
            },
            "features": {
                "feature_X": {},
                "feature_Y": {},
                "feature_Z": {}
            }
        }
    ]
}
```

FIG. 2

PROFILE REGISTRY AND RESOURCE MANAGEMENT

BACKGROUND

The present disclosure is directed to the management of functionality or capability in a network device. Functionality can refer to device-level capability. For example, a network device can be configured to provide packet switching functionality (e.g., as in a Layer 2 (L2) switch, a Layer 3 (L3) router, etc.), virtual tunnel endpoint (VTEP), gateway, firewall, test access point (TAP) device, and so on. Functionality can also refer to features (extensions, add-on capability) that are added to a network device. For example, a network device configured as a packet switch can be enhanced with a feature that timestamps packets. Functionality in a network device can be implemented by suitably programming one or more programmable devices in the network device, such as field programmable gate arrays (FPGAs), programmable clocks, embedded processors, and so on.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 2 is an illustrative example of a profile in accordance with the present disclosure.

DETAILED DESCRIPTION

Embodiments in accordance with the present disclosure provide for management of programmable devices (e.g., FPGAs) in a network device to implement functionality on a network device. A network device in accordance with the present disclosure includes an extension manager, a profile registrar, and a resource manager. In some embodiments, the extension manager can receive and install an application installation file for a given application on the network device. The profile registrar can manage the profile(s) contained in the application installation file; for example, register the profiles in a profile registry. The resource manager can manage the loading of profiles to implement or otherwise instantiate the functionality on the network device provided by the application. A user interface can allow a user to select an installation file from among the previously received application installation files.

Over time, different procedures for defining and installing applications have evolved between vendors and third party developers. As a result a user who wants to install an application has to be aware of different ways that an application may be defined and installed, which can vary from one provider to the next. Embodiments in accordance with the present disclosure provide a common framework for defining, managing, and installing applications. Having a single standardized mechanism lets vendors open up their systems to third party developers to facilitate integration of their applications into the ecosystem, providing end users more options and flexibility to configure and manage their deployments. The framework provides a mechanism to receive and manage metadata (profiles, bitfiles, etc.) for an application and integrate the application into the system, which can benefit both third party developers and vendors.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
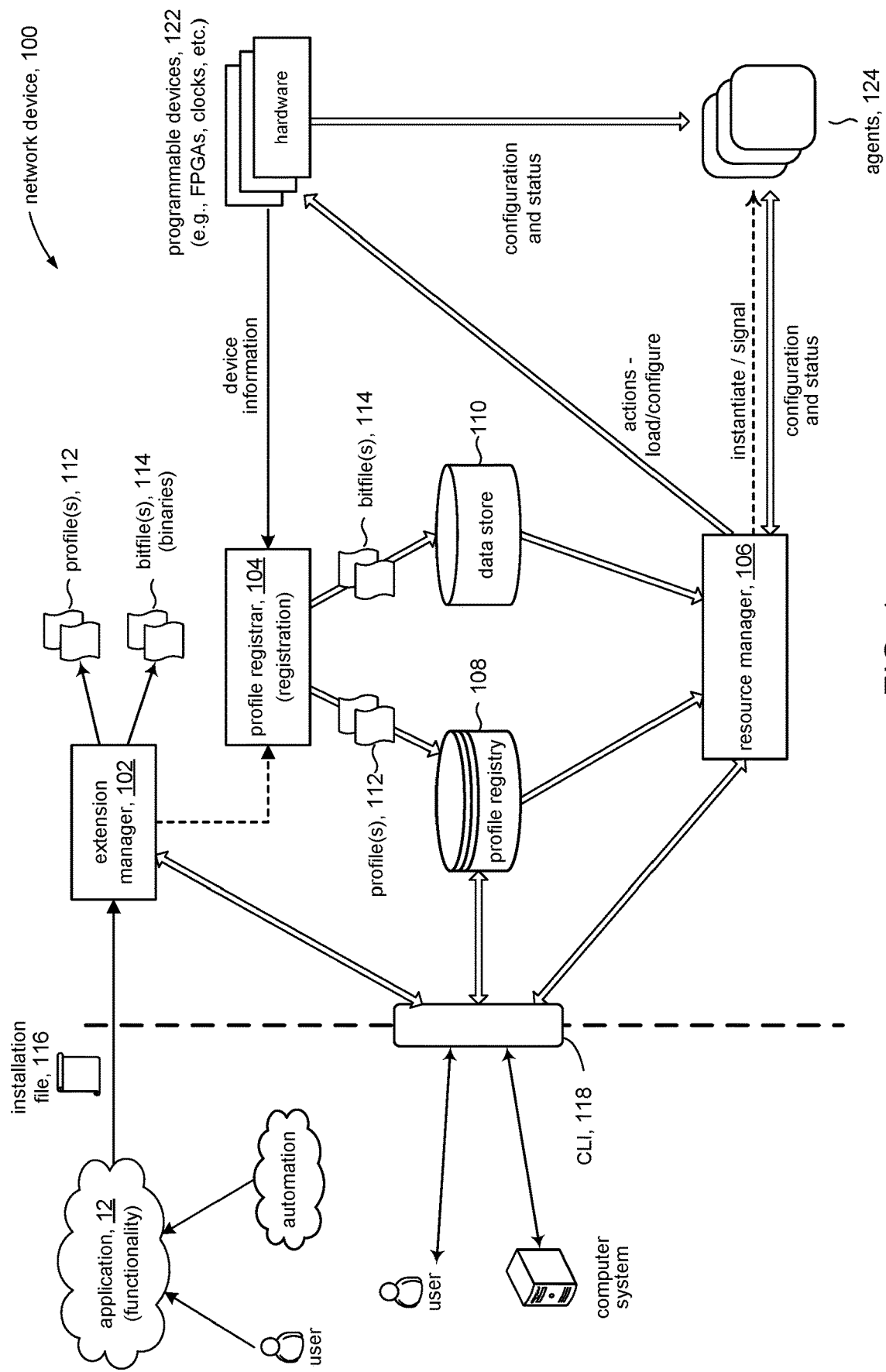
FIG. 1 illustrates aspects of a network device in accordance with the present disclosure.

FIG. 1 represents aspects of a network device in which embodiments of the present disclosure can operate. In accordance with some embodiments, for instance, network device 100 can include an extension manager 102, a profile registrar 104, and a resource manager 106. Application installation file 116 for an application 12 can be downloaded and stored on the network device; e.g., via scp, secure copy.

An "application" as used herein can refer to a feature, functionality, or capability that can be installed in the network device. An application can refer to functionality or capability provided by the network device as a whole. For instance, an application can refer to configuring a network device to operate as a packet switch, a network TAP device, a gateway, and so on. An application can also refer to functionality or capability that is added to a network device to enhance its operation. For example, a network device configured to operate as a packet switch can be enhanced with a feature to timestamp packets that are switched by the network device. Applications may also be referred to as "extensions" in that they extend the capability of the network device. As used in the present disclosure, the terms application and extension can be deemed to be interchangeable.

Applications 12 can be developed by the vendor of the network device. For example, the vendor can configure and sell a network device as an L2 switch. Applications 12 can be developed by the end user of the network device (e.g., network administrator) to add features to their network device. Features can also be developed by third party developers, and so on. In some embodiments, a development utility (e.g., an application development kit) can be used to facilitate specifying the application and programmatically generate the application installation file. The utility can be a standalone software package (e.g., an application development kit), the utility can be web-based, and so on.

In accordance with some embodiments, application installation file 116 is a data object that comprises information (e.g., a set of files) relating to installing and configuring an application 12 on network device 100. For example, the application installation file 116 can include one or more profiles 112 that specify different instances of the application. For example, suppose application 12 is a switch. One profile may define an instance of the switch application that can provide high throughput but with few capabilities, while another profile may define an instance of the switch application to have more capability but with higher latency.

In some embodiments, each profile 112 can identify one or more bitfiles 114 used to program programmable devices to implement a given instance of the application 12. The profile can identify the location of the bitfiles in the network device (e.g., pathname), target type, and so on. Bitfiles are discussed in more detail below.

Profiles 112 can be created by any suitable means. In some embodiments, for example, profiles 112 can be manually created by the user during the development of application 12. In other embodiments, the profiles may be programmatically generated directly from the application 12, for example, by some suitable automated process.

Profiles 112 can be expressed in a pre-defined structured file format such as JSON (Java-script object notation), YAML (yet another markup language), and the like. More generally, the information can be expressed in any file format that allows the expression of complex data structures, even a custom domain-specific language. YAML and JSON are just two examples of formats suitable for the purpose, along with many others such as extended Markup Language (XML), Tom's Obvious Minimal Language (TOML), etc. FIG. 2 shows an illustrative example of a profile 212.

As noted above, application installation file 116 can include one or more bitfiles 114 comprising binary code to program or otherwise configure one or more programmable integrated circuits 122 (ICs, referred to herein as programmable devices or simply "devices") in network device 100 to implement the application. A programmable device can be any suitable programmable device such as an FPGA, programmable clock, embedded processor, and the like. A switch application, for example, may have a set of one or more bitfiles to program one or more FPGAs to instantiate a 64-port switch and another set of bitfiles to program the FPGAs to instantiate a 128-port switch. As another example, a multiplexer (mux) application may have a set of bitfiles to program FPGAs to instantiate a 4-to-1 mux, another set of bitfiles to program the FPGAs to instantiate a 8-to-1 mux, and so on.

The extension manager can unbundle the received application installation file 116 to obtain the components contained in the application installation file, such as profiles 112, bitfiles, 114, and the like. The bitfiles 114 can be stored in a data store 110. In some embodiments, profile registrar 104 can store profiles 112 contained in the received application installation file into profile registry 108.

Resource manager 106 can program devices 122 with corresponding bitfiles 114 stored in the data store 110. In some embodiments, for example, a user can specify a profile 112 to be loaded. The resource manager 106 can access the bitfile 114 associated with the specified profile and load the accessed bitfile into a respective device 122 to program the device. The resource manager 106 can trigger (e.g., instantiate or signal) one or more agents 124 to manage or otherwise interact with the programmed device. Agents 124 can be background processes running on network device 100.

Agents 124 can interact with the programmed devices to configure programmed devices and to read status information from the devices. Consider, for example, an FPGA programmed as a switch core. An agent can configure ports on the switch core, such as port speed, enable/disable ports, and so on. The same, or another, agent can read out the status of those ports, and so on.

The network device can include CLI 118 to provide access to manage the profiles and bitfiles that constitute an application 12. The CLI can manage applications that are stored in the network device, but are not otherwise running on the network device. The CLI can also manage applications that are running on the network device. In some embodiments, CLI 118 can be a command line interface that is accessed via a physical port (e.g., Ethernet connection) on the network device 100, a web-based interface, and so on. In other embodiments, CLI 118 can be a machine interface that interacts with another computer system (e.g., network controller) to manage applications on the network device. Following is an illustrative, non-exhaustive list of commands that can be supported by CLI 118 in accordance with some embodiments of the present disclosure:

store application—This command can be used to input an application installation file (e.g., 116) for an application 12 to be stored on the network device. The profiles and bitfile that constitute the application can be stored on the network device (e.g., in profile registry 108, data store 110), but are not otherwise running on the network device.

delete application—This command can be used to remove the whole application from the network device, including, for example, deleting the profiles and bitfiles from the network device.

list stored applications/profiles—This command can be used to present a list of stored applications and their respective profiles. In some embodiments, the bitfiles may be listed as well, such as location, size, etc. As used herein, a stored application refers to an application whose profiles and bitfiles are stored on the network device but is not running on the network device.

In some embodiments, profiles that are not suitable on the network device can be omitted from the list. For example, if a profile configures an application to use hardware (e.g., an FPGA on a line card) that is not currently installed in the network device, then that profile can be omitted from the list. Another example would be that the profile is incompatible with all installed hardware (e.g., incompatible FPGA hardware).

In some embodiments, profiles that are not suitable on the network device can nonetheless be listed with an indication that profiles are not with the current hardware on the network device.

list "running" applications/profiles—This command can be used to present a list of running applications and their respective profiles. As used herein, a running application refers to an application whose bitfiles have been loaded into programmable devices in the network device. Accordingly, the terms "running" and "loaded" can be used interchangeably.

load/unload application—This command can be used to instantiate a selected application to enable a feature on the network device, and to stop a running application. In some embodiments, this command can include a parameter that specifies a profile to configure the application. If a profile is not specified, the application can run with a default configuration.

load/unload profile—This command can be used to configure a running application with a selected profile. This command can be used to change the configuration of the running application for different modes of operation. This command can also be useful to quickly "reboot" a multi-device application if one of the programmable devices has failed, by simply reloading the profile for the failed device without having to reload the other devices.

show state of profiles—This command can be used to show the state of profiles stored in the network device. The profile state (see operation 512, FIG. 5) can indicate whether or not the profile is loaded in a programmable device, loading errors, and so on.

Figure 3:
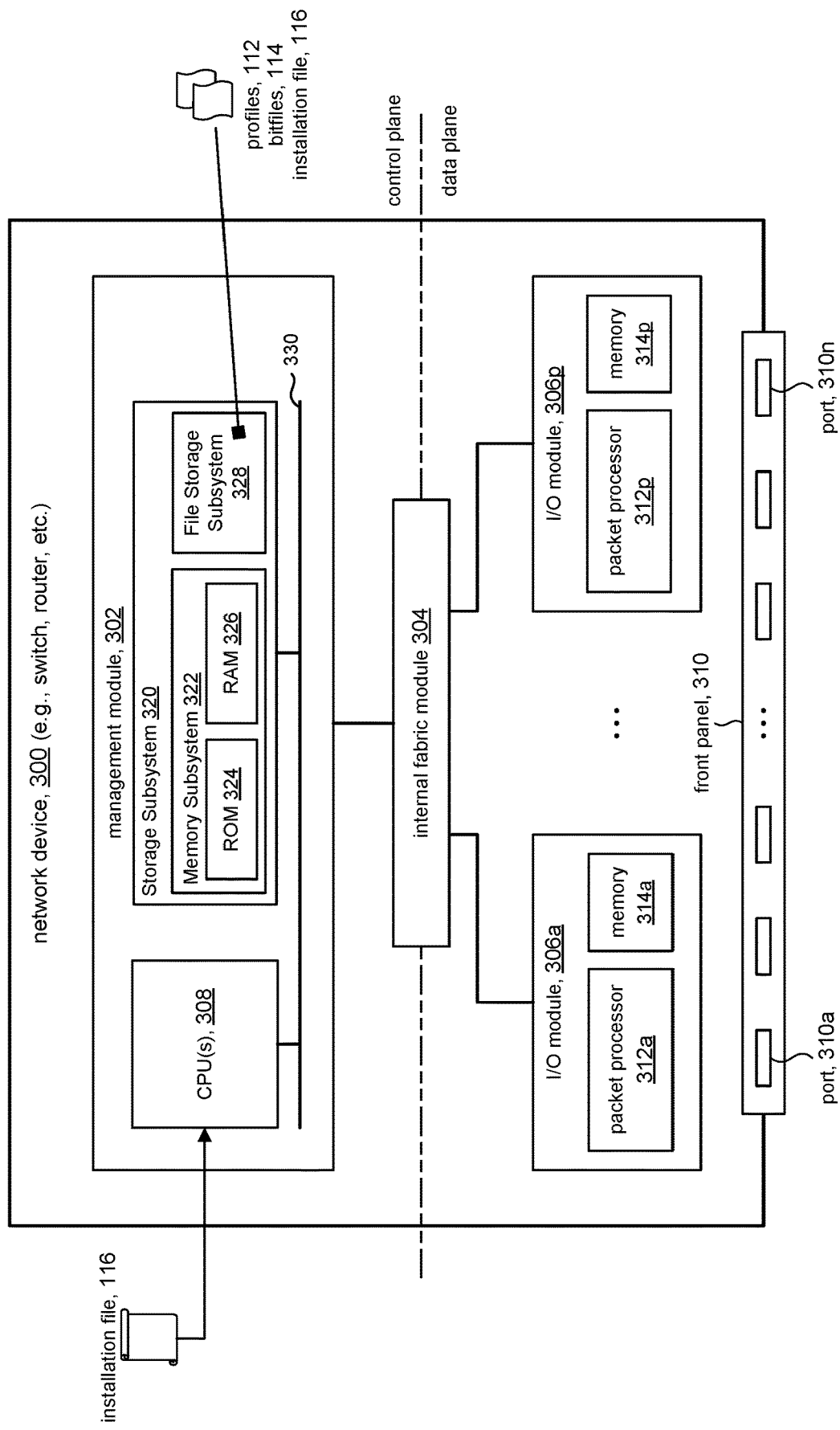
FIG. 3 shows an illustrative example of a network device that can be configured to operate in accordance with the present disclosure.

FIG. 3 is a schematic representation of a network device 300 (e.g., a router, switch, firewall, and the like) that can be adapted in accordance with the present disclosure. In some embodiments, for example, network device 300 can include a management module 302, an internal fabric module 304, one or more I/O modules 306a-306p, and a front panel 310 of I/O ports (physical interfaces) 310a-310n. Management module 302 can constitute the control plane (also referred to as a control layer or simply the CPU) of network device 300, and can include one or more management CPUs 308 for managing and controlling operation of network device 300 in accordance with the present disclosure. Each management CPU 308 can be a general-purpose processor, such as an Intel®/AMD® x86, ARM® microprocessor and the like, that operates under the control of software stored in a memory device/chips such as ROM (read-only memory) 324 or RAM (random-access memory) 326. The control plane provides services that include traffic management functions such as routing, security, load balancing, analysis, and the like.

The one or more management CPUs 308 can communicate with storage subsystem 320 via bus subsystem 330. Other subsystems, such as a network interface subsystem (not shown in FIG. 3), may be on bus subsystem 330. Storage subsystem 320 can include memory subsystem 322 and file/disk storage subsystem 328. Memory subsystem 322 and file/disk storage subsystem 328 represent examples of non-transitory computer-readable storage devices that can store program code and/or data, which when executed by one or more management CPUs 308, can cause one or more management CPUs 308 to perform operations in accordance with embodiments of the present disclosure; e.g., receive and process application installation file 116.

Memory subsystem 322 can include a number of memories such as main RAM 326 (e.g., static RAM, dynamic RAM, etc.) for storage of instructions and data during program execution, and ROM (read-only memory) 324 in which fixed instructions and data can be stored. File storage subsystem 328 can provide persistent (i.e., non-volatile) storage for program and data files (e.g., application installation file 116, profile registry 108 for profiles 112, data store 110 for bitfiles 114), and can include storage technologies such as solid-state drive and/or other types of storage media known in the art.

Management CPUs 308 can run a network operating system stored in storage subsystem 320. A network operating system is a specialized operating system for network device 300. For example, the network operating system can be the Arista Extensible Operating System (EOS®), which is a fully programmable and highly modular, Linux-based network operating system, developed and sold/licensed by Arista Networks, Inc. of Santa Clara, California. Other network operating systems may be used.

Bus subsystem 330 can provide a mechanism for the various components and subsystems of management module 302 to communicate with each other as intended. Although bus subsystem 330 is shown schematically as a single bus, alternative embodiments of the bus subsystem can utilize multiple busses.

Internal fabric module 304 and the one or more I/O modules 306a-306p can be collectively referred to as the data plane of network device 300 (also referred to as the data layer, forwarding plane, etc.). Internal fabric module 304 represents interconnections among the various other modules of network device 300. Each I/O module 306a-306p can include a packet processing pipeline, logically represented by respective packet processors 312a-312p and memory hardware 314a-314p, to provide packet processing and forwarding capability. Each I/O module 306a-306p can be further configured to communicate over one or more ports 310a-310n on the front panel 310 to receive and forward network traffic. Packet processors 312a-312p can comprise hardware (circuitry), including for example, data processing hardware such as an ASIC (application specific integrated circuit), FPGA (field programmable array), digital processing unit, and the like. Memory hardware 314a-314p can include lookup hardware, for example, content addressable memory such as TCAMs (ternary CAMs) and auxiliary memory such as SRAMs (static RAM). The forwarding hardware in conjunction with the lookup hardware can provide wire speed decisions on how to process ingress packets and outgoing packets for egress. In accordance with some embodiments, some aspects of the present disclosure can be performed wholly within the data plane.

Figure 4:
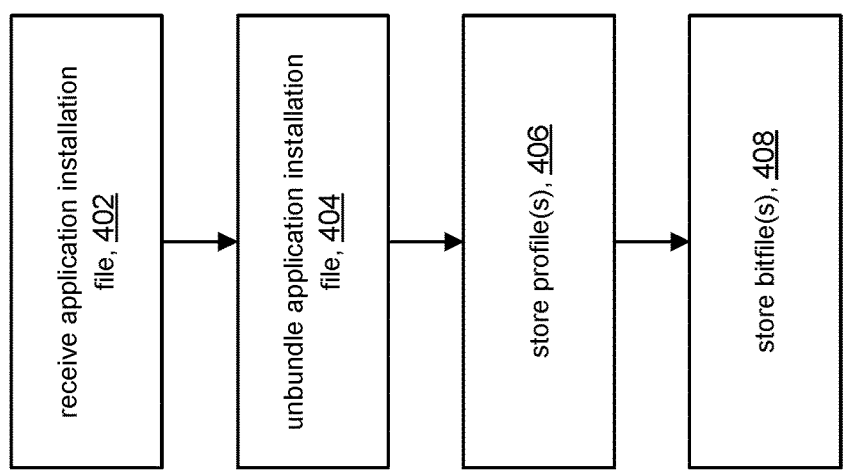
FIG. 4 is a high level flowchart showing operations to process an application installation file in accordance with the present disclosure.

Referring to FIG. 4, the discussion will now turn to a high-level description of processing in a network device for receiving and processing applications and profiles in accordance with the present disclosure. In some embodiments, for example, the network device can include one or more digital processing units (circuits), which when operated, can cause the network device to perform processing in accordance with FIG. 4. For example, digital processing units (circuits) in the control plane can include general CPUs that operate by way of executing computer program code stored on a non-volatile computer readable storage medium (e.g., read-only memory); e.g., CPU 308 in the control plane (FIG. 3) can be a general CPU. The operation and processing blocks described below are not necessarily executed in the order shown. Operations can be combined or broken out into smaller operations in various embodiments. Operations can be allocated for execution among one or more concurrently executing processes and/or threads.

At operation 402, the network device (e.g., extension manager 102) can receive an application installation file (e.g., 116) for a given application 12. In some instances, for example, the application installation file can be input by a user. In other instances the application installation file can be received from another computer system (e.g., a central controller). The application installation file includes information to program or otherwise configure one or more programmable devices (e.g., 122) in the network device to implement functionality in the network device associated with the application.

At operation 404, the network device (e.g., extension manager 102) can unbundle the received application installation file to obtain one or more profiles (e.g., 112) and one or more bitfiles (e.g., 114) associated with the application. As noted above, a given application may be configurable for multiple modes of operation. Each configuration (or mode of operation) can be represented by a corresponding profile. The profile can specify among other things the programmable devices used to implement the particular configuration of the application and the corresponding bitfiles (e.g., storage location in the network device) that are loaded into the programmable devices. Consider the MetaMux® application, which provides multiplexing/aggregation of incoming streams and is sold/licensed by Arista Networks, Inc. of Santa Clara, California. The application can be configured to provide different mux instances; from a single 48:1 mux to multiple 4:1 muxes. For example, there can be one profile for the 48:1 mux configuration, another profile for a configuration comprising two 24:1 mux instances, another profile for a configuration of three 16:1 mux instances, and so on. Each profile can specify one or more programmable devices and one or more corresponding bitfiles used to implement the corresponding configuration.

At operation 406, the network device (e.g., profile registrar 104) can register each profile that is contained in a received application installation file. In some embodiments, for example, the network device can store each profile in a profile registry (e.g., 108).

At operation 408, the network device (e.g., profile registrar 104) can store the bitfiles for each profile in a data store (e.g., 110).

Figure 5:
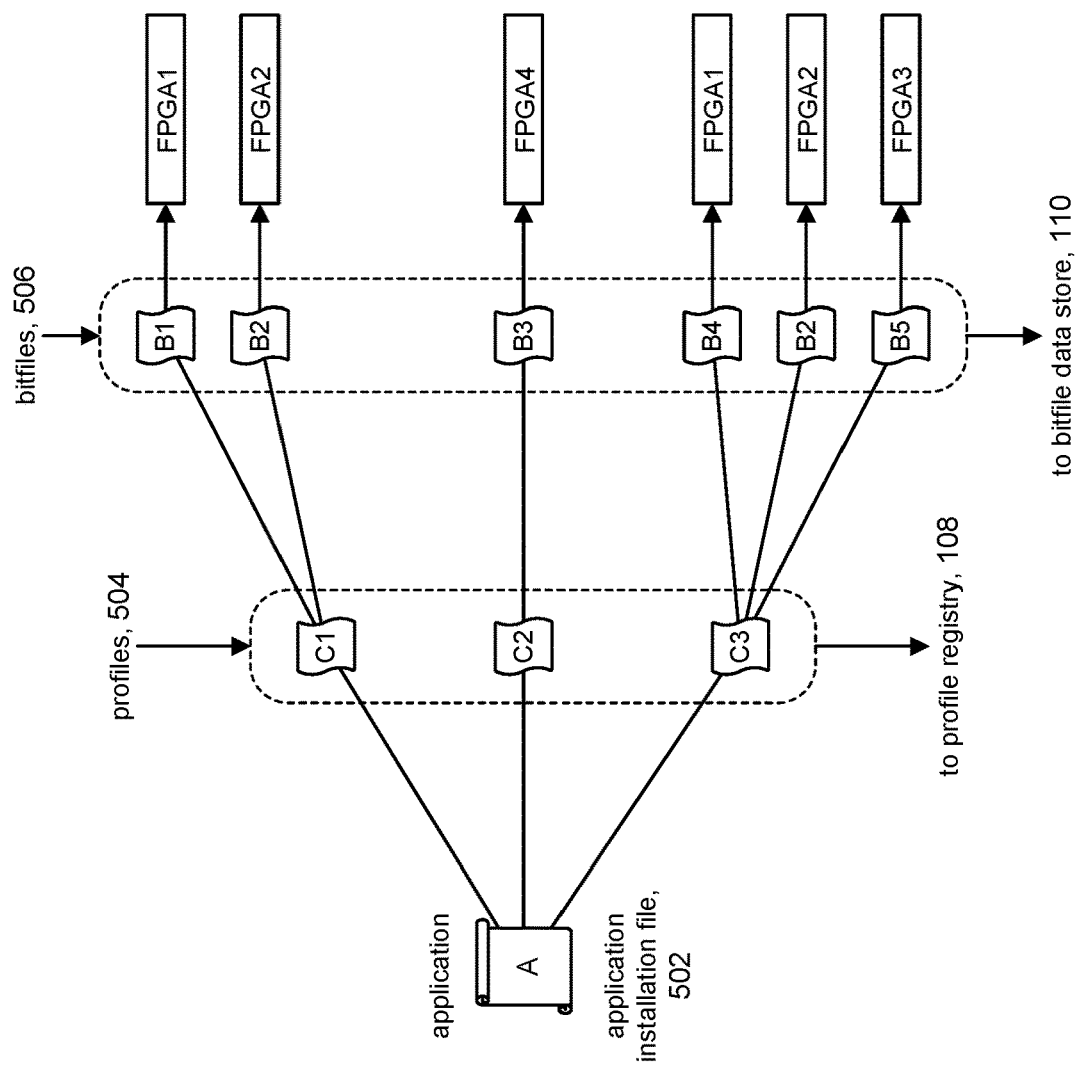
FIG. 5 illustrates an example of an application installation file.

FIG. 5 is a pictorial representation of an example of an application installation file 502 that can be processed in accordance with FIG. 4. An application A for a network device can be developed; e.g., by the vendor of the network device, a user, etc. Application A can be any functionality for the network device; e.g., packet switching, packet multiplexing, etc. The data objects that are created to implement the functionality on the network device are contained in an application installation file 502. The data objects include profiles 504 and bitfiles 506. As noted above, the application A may be configurable, for example, in terms of number of ports, different functions, etc. Each configuration of application A can be represented by a profile 504. A profile specifies one or more programmable devices (e.g., FPGAs) for implementing a configuration of the application and the corresponding one or more bitfiles to be loaded into those FPGAs.

For instance, in the example shown in FIG. 5, the profile for configuration C1 indicates that FPGA1 and FPGA2 on the network device implement the particular configuration C1 of application A. The profile for configuration C1 also specifies bitfiles B1 and B2 to be loaded into FPGA1 and FPGA2, respectively. Likewise with the profiles for configurations C2 and C3.

It is noted that different configurations of an application A may involve the same or different programmable devices loaded with the same or different bitfiles. The example in FIG. 5 illustrates this can be reflected in the different profiles 504. For example, the profile specifies FPGA1 and FPGA2 for configuration C1, but specifies only FPGA4 to implement configuration C2. A given programmable device may be loaded with different bitfiles for different configurations. For example, FPGA1 is loaded with bitfile B1 for configuration C1, but for configuration C3, FPGA1 is loaded with bitfile B4. A programmable device that is used in different configurations may be loaded with the same bitfile. For example, FPGA2 loaded with bitfile B2 are used in both configuration C1 and in configuration C3.

Figure 6:
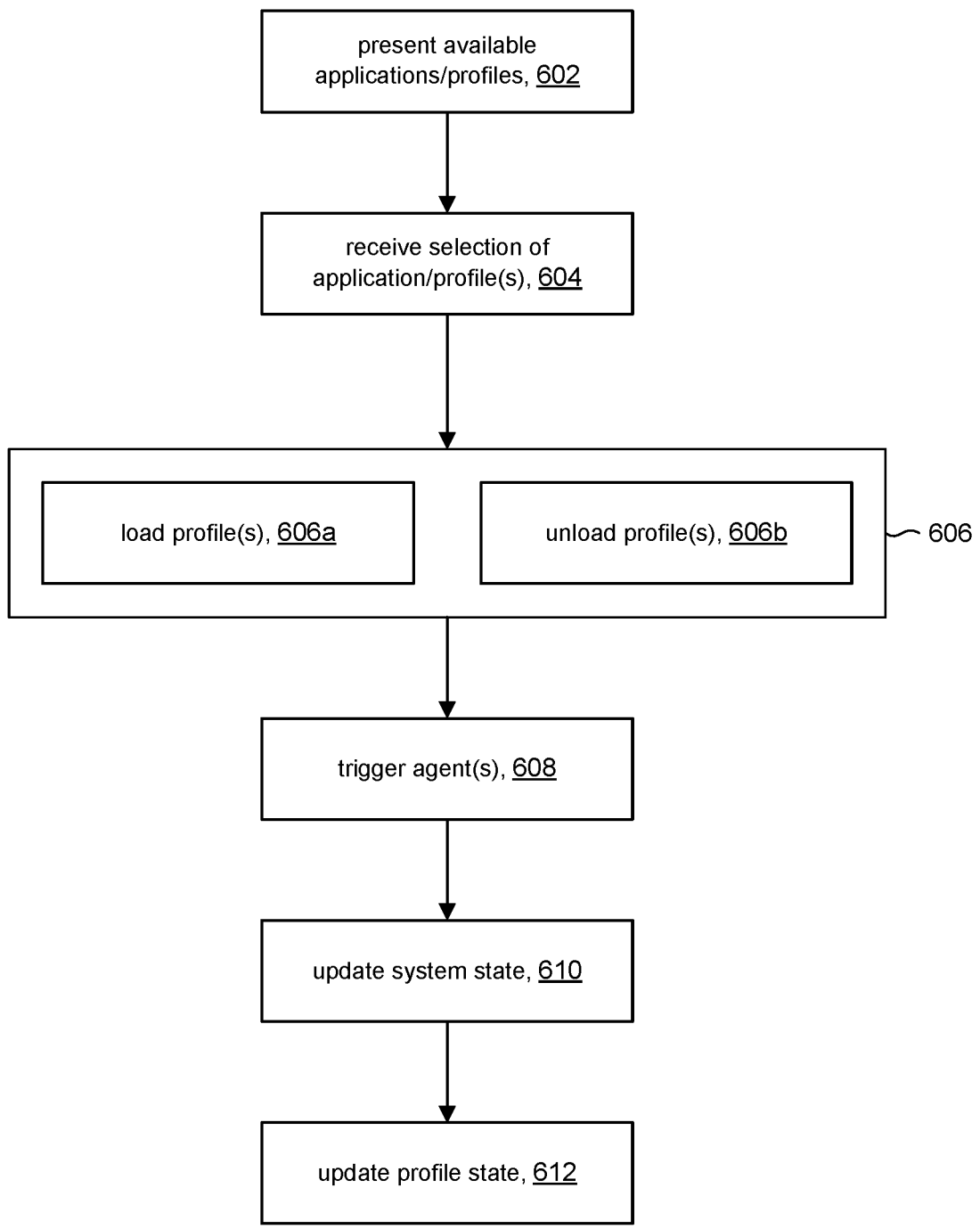
FIG. 6 is a high level flowchart showing operations for implementing functionality associated with an application in accordance with the present disclosure.

Referring to FIG. 6, the discussion will now turn to a high-level description of processing in a network device (e.g., in resource manager 106, FIG. 1) for managing stored applications and implementing a selected application in accordance with the present disclosure. In some embodiments, for example, the network device can include one or more digital processing units (circuits), which when operated, can cause the network device to perform processing in accordance with FIG. 6. For example, digital processing units (circuits) in the control plane can include general CPUs that operate by way of executing computer program code stored on a non-volatile computer readable storage medium (e.g., read-only memory); e.g., CPU 308 in the control plane (FIG. 3) can be a general CPU. The operation and processing blocks described below are not necessarily executed in the order shown. Operations can be combined or broken out into smaller operations in various embodiments. Operations can be allocated for execution among one or more concurrently executing processes and/or threads.

At operation 602, the network device can present a list of available applications (functionalities, features, etc.) to a user (e.g., from the profile registry 110 via CLI 118). In some embodiments, the network device can be configured to present a suitable user interface (UI) to provide a user with access to profiles stored on the network device. The "user" can be a human user or a computer system (e.g., central controller). In some embodiments, the list can include applications and profiles for configurations of the application. The list can indicate whether a profile is loaded (running) on the network device or not. The list can be filtered based on the current hardware configuration of the network device. For example, profiles requiring hardware that is not installed on the network device, or is not compatible with installed hardware can be omitted from the list. In other embodiments, the network device can list all the stored applications and profiles, but also include an indication whether or not the application is compatible with the current hardware configuration of the network device.

At operation 604, the network device can receive a selection of a profile for an application.

At operation 606, the network device (e.g., resource manager 106) can load (install) 606a or unload (uninstall) 606b each selected profile:

Loading a selected profile to activate or otherwise implement an application on the network device configured in accordance with the profile. The profile can specify one or more programmable devices in the network device; e.g., an FPGA. The profile can include location information that identifies the storage location in the network device of the corresponding bitfiles (e.g., in data store 110) that can be used to program or otherwise configure the programmable device. The network device can access the bitfile(s) and load the accessed bitfile(s) into the programmable device(s) to program the device(s) thereby instantiating the application or functionality.

In some embodiments, the network device (e.g., resource manager 106) can verify if the bitfile is compatible with the target programmable device; e.g., the bitfile is suitable for the installed version of the chipset that makes up the programmable device, part numbers, etc. For instance, the profile may include version information or part number information that can be compared with the version or part number of the target programmable device. If compatibility is confirmed, then the device can be programmed; otherwise, the network device can flag an error.

Unloading a selected profile to deactivate the associated application. The network device can deactivate the application associated with the selected profile. In some embodiments, for example, the network device can disable the programmed device(s) identified in the selected profile, for example, by asserting a RESET signal line or other similar action on each device.

At operation 608, the network device can trigger the agents (if any) associated with each of the selected profiles.

In the case of loading a profile, the network device can trigger (instantiate/signal) agent(s) identified in the profile as part of programming the device identified in the profile. The triggered agent(s) can then communicate with the programmed device to configure the device for operation, and to read out status information during operation of the device.

In the case of unloading a profile, the network device can signal any agents that are in communication with the device that the device is being unloaded.

At operation 610, the network device can update the system state to reflect whether the device(s) associated with each of the selected profiles have been enabled (installed) or disabled (uninstalled).

At operation 612, the network device can update the profile state to reflect whether each of the selected profiles have been loaded or unloaded. In some embodiments, the profile state can be stored in the profile.

Further Examples

Features described above as well as those claimed below may be combined in various ways without departing from the scope hereof. The following examples illustrate some possible, non-limiting combinations:

(A1) A method in a network device to provide functionality in the network device, the method comprising: receiving an installation file associated with functionality for the network device, the installation file comprising information that describes one or more programmable devices that implement the functionality; obtaining at least one profile from the installation file, the profile specifying a configuration of the functionality; storing the profile in a profile database (DB), the profile DB having stored therein profiles obtained from previously received installation files associated with other functionalities for the network device; obtaining at least one bitfile from the installation file, the bitfile for programming the programmable device in the network device to implement the functionality; storing the bitfile in a data store, the data store having stored therein bitfiles obtained from previously received installation files associated with other functionalities for the network device; receiving a selected functionality associated with a previously received installation file; and implementing the selected functionality on the network device, including: identifying from among the profiles stored in the profile DB a profile associated with the selected functionality; and accessing and loading one or more programmable devices of the network device with corresponding one or more bitfiles identified in the profile.

(A2) For the method denoted as (A1), implementing the selected functionality further includes: instantiating or signaling one or more agents to interact with one or more loaded programmable devices; and updating system state information with status of the one or more loaded programmable devices.

(A3) For the method denoted as any of (A1) through (A2), the programmable devices include one or more of a field programmable gate array, a programmable clock, and an embedded processor.

(A4) For the method denoted as any of (A1) through (A3), the installation file associated with the functionality includes a plurality of profiles, each profile corresponding to a configuration of the functionality.

(A5) For the method denoted as any of (A1) through (A4), the installation file associated with the functionality further includes a plurality of one or more bitfiles corresponding to each configuration of the functionality.

(A6) The method denoted as any of (A1) through (A5), further comprising, assessing compatibility between a programmable device and a corresponding bitfile prior to loading the programmable device with the corresponding bitfile, based on version information or part number information of the programmable device.

(A7) For the method denoted as any of (A1) through (A6), the installation file is expressed in JavaScript Object Notation (JSON) format or Yet Another Markup Language (YAML) format, or eXtended Markup Language (XML) format, or Tom's Obvious Minimal Language (TOML) format.

(B1) A method in a network device, the method comprising: storing a plurality of profiles in a profile data store, the plurality of profiles associated with a plurality of applications for the network device; receiving a selected application from among the plurality of applications; and implementing the selected application in the network device by: accessing a profile associated with the selected application from the profile data store; programming at least one programmable device specified in the profile using a bitfile specified in the profile; and triggering a software agent to communicate with the at least one programmed programmable device.

(B2) For the method denoted as (B1), accessing a profile associated with the selected application includes accessing the profile from a plurality of profiles associated with the selected application, wherein each profile in the plurality of profiles represents a configuration of the application.

(B3) For the method denoted as any of (B1) through (B2), receiving a selected application includes receiving input from a user.

(B4) For the method denoted as any of (B1) through (B3), enabling the functionality in the network device further includes updating system state information with status of one or more of the programmed programmable devices.

(B5) For the method denoted as any of (B1) through (B4), the at least one programmable device includes one or more of a field programmable gate array, a programmable clock, and an embedded processor.

(B6) The method denoted as any of (B1) through (B5), further comprising storing an application on the network device, including: receiving an installation file associated with the application, the installation file comprising at least one profile and at least one bitfile; and storing the at least one profile in the profile data store and the at least one bitfile in a data store.

(B7) The method denoted as any of (B1) through (B6), further comprising assessing compatibility between a programmable device and a corresponding bitfile prior to programming the at least one programmable device specified in the profile using a bitfile specified in the profile.

(C1) A network device comprising: a data store; a plurality of programmable devices; one or more computer processors; and a computer-readable storage device comprising instructions for controlling the one or more computer processors to: receive a selected application from among a plurality of applications; and implement the selected application in the network device by: accessing a profile associated with the selected application from among a plurality of profiles stored in the data store; programming one of the plurality of programmable devices specified in the profile using a bitfile specified in the profile; and triggering a software agent to communicate with the programmed programmable device.

(C2) For the network device denoted as (C1), the computer-readable storage device further comprises instructions for controlling the one or more computer processors to receive a selected application by receiving input from a user.

(C3) For the network device denoted as any of (C1) through (C2), the computer-readable storage device further comprises instructions for controlling the one or more computer processors to implement the selected application by accessing the bitfile specified in the profile from among a plurality of bitfiles stored in the data store.

(C4) For the network device denoted as any of (C1) through (C3), the computer-readable storage device further comprises instructions for controlling the one or more computer processors to implement the selected application by updating system state information with status of one or more of the programmed programmable devices.

(C5) For the network device denoted as any of (C1) through (C4), the plurality of programmable devices include one or more of a field programmable gate array, a programmable clock, and an embedded processor.

(C6) For the network device denoted as any of (C1) through (C5), the computer-readable storage device further comprises instructions for controlling the one or more computer processors to store an application on the network device, including: receiving an installation file associated with the application, the installation file comprising at least one profile and at least one bitfile; and storing the at least one profile in the profile data store and the at least one bitfile in a data store.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a network device, the method comprising:
storing a plurality of profiles in a data store of the network device, the plurality of profiles associated with a plurality of applications for the network device;
storing a plurality of bitfiles in the data store, each bitfile of the bitfiles being an executable code of each application of the applications;
receiving a selected profile from among the plurality of profiles stored in the data store;
implementing an application of the applications associated with the selected profile in the network device by:
accessing a bitfile specified in the selected profile from among the plurality of bitfiles, wherein the bitfile is an executable code of the application;
programming at least one programmable device of a plurality of programmable devices of the network device specified in the selected profile using the accessed bitfile specified in the selected profile, wherein the programming the at least one programmable device further includes updating system state information with status of one or more programmed programmable devices of the programmable devices; and
triggering a software agent to run on the network device to communicate with the at least one programmed programmable device; and
assessing compatibility between the at least one programmable device and a corresponding bitfile of the bitfiles prior to the programming the at least one programmable device specified in the profile using the bitfile specified in the profile.

2. The method of claim 1, wherein each profile in the plurality of profiles represents a configuration of the associated application.

3. The method of claim 1, wherein receiving a selected profile includes receiving input from a user.

4. The method of claim 1, wherein the at least one programmable device includes one or more of a field programmable gate array, a programmable clock, and an embedded processor.

5. The method of claim 1, further comprising storing an application on the network device, including: receiving an installation file associated with the application, the installation file comprising at least one profile and at least one bitfile; and storing the at least one profile and the at least one bitfile in the data store.

6. A network device comprising:
a data store;
a plurality of programmable devices;
one or more computer processors; and
a computer-readable storage device comprising instructions for controlling the one or more computer processors to:
store a plurality of profiles in the data store of the network device, the plurality of profiles associated with a plurality of applications for the network device;
store a plurality of bitfiles in the data store, each bitfile of the bitfiles being an executable code of each application of the applications;
receive a selected profile from among the plurality of profiles stored in the data store;
implement an application of the applications associated with the selected profile in the network device by:
accessing a bitfile specified in the selected profile from among the plurality of bitfiles, wherein the bitfile is an executable code of the application associated with the selected profile;
programming at least one programmable device of the plurality of programmable devices of the network device specified in the selected profile using the accessed bitfile specified in the selected profile, wherein the programming the at least one programmable device further includes updating system state information with status of one or more programmed programmable devices of the programmable devices;
triggering a software agent to run on the network device to communicate with the programmed programmable device; and
assessing compatibility between the at least one programmable device and a corresponding bitfile of the bitfiles prior to the programming the at least one programmable device specified in the profile using the bitfile specified in the profile.

7. The network device of claim 6, wherein the computer-readable storage device further comprises instructions for controlling the one or more computer processors to receive a selected profile by receiving input from a user.

8. The network device of claim 6, wherein the plurality of programmable devices include one or more of a field programmable gate array, a programmable clock, and an embedded processor.

9. The network device of claim 6, wherein the computer-readable storage device further comprises instructions for controlling the one or more computer processors to store an application on the network device, including: receiving an installation file associated with the application, the installation file comprising at least one profile and at least one bitfile; and storing the at least one profile and the at least one bitfile in the data store.

10. A non-transitory computer-readable storage device in a network device, the non-transitory computer-readable storage device having stored thereon computer executable instructions, which when executed, cause the network device to:
store a plurality of profiles in a data store of the network device, the plurality of profiles associated with a plurality of applications for the network device;
store a plurality of bitfiles in the data store, each bitfile of the bitfiles being the executable code of each application of the applications;
receive a selected profile from among the plurality of profiles stored in the data store; and
implement an application of the applications associated with the selected profile in the network device by:
accessing a bitfile specified in the selected profile from among the plurality of bitfiles, wherein the bitfile is an executable code of the application associated with the selected profile;
programming at least one programmable device of a plurality of programmable devices of the network device specified in the selected profile using the accessed bitfile specified in the selected profile, wherein the programming the at least one programmable device further includes updating system state information with status of one or more programmed programmable devices of the programmable devices; and
triggering a software agent to run on the network device to communicate with the at least one programmed programmable device; and
assess compatibility between the at least one programmable device and a corresponding bitfile of the bitfiles prior to the programming the at least one programmable device specified in the profile using the bitfile specified in the profile.

11. The non-transitory computer-readable storage device of claim 10, wherein each profile in the plurality of profiles represents a configuration of the associated application.

12. The non-transitory computer-readable storage device of claim 10, wherein receiving a selected profile includes receiving input from a user.

13. The non-transitory computer-readable storage device of claim 10, wherein the at least one programmable device includes one or more of a field programmable gate array, a programmable clock, and an embedded processor.

14. The non-transitory computer-readable storage device of claim 10, wherein the computer executable instructions, which when executed, further cause the network device to: receive an installation file associated with the application, the installation file comprising at least one profile and at least one bitfile; and store the at least one profile and the at least one bitfile in the data store.

* * * * *